United States Patent
Hall, III et al.

(10) Patent No.: US 9,714,081 B1
(45) Date of Patent: Jul. 25, 2017

(54) SYSTEM AND METHOD FOR AVIONICS INTEGRITY AND PROTECTION

(71) Applicants: Ivan N. Hall, III, Iowa City, IA (US); Kaushik Raghu, Cedar Rapids, IA (US); Eric N. Anderson, Cedar Rapids, IA (US); Sara A. Jump, Cedar Rapids, IA (US); Rachel D. Sparks, Alburnett, IA (US); Jesse B. Pate, Cedar Rapids, IA (US); Keith A. Stover, Cedar Rapids, IA (US); Daniel E. Mazuk, Marion, IA (US)

(72) Inventors: Ivan N. Hall, III, Iowa City, IA (US); Kaushik Raghu, Cedar Rapids, IA (US); Eric N. Anderson, Cedar Rapids, IA (US); Sara A. Jump, Cedar Rapids, IA (US); Rachel D. Sparks, Alburnett, IA (US); Jesse B. Pate, Cedar Rapids, IA (US); Keith A. Stover, Cedar Rapids, IA (US); Daniel E. Mazuk, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 14/014,101

(22) Filed: Aug. 29, 2013

(51) Int. Cl.
| | |
|---|---|
| *B64C 19/00* | (2006.01) |
| *H04W 12/06* | (2009.01) |
| *B64D 47/00* | (2006.01) |
| *G06F 3/0481* | (2013.01) |
| *H04L 29/08* | (2006.01) |
| *B64D 43/00* | (2006.01) |
| *G06F 11/07* | (2006.01) |
| *G06F 21/31* | (2013.01) |
| *G06F 3/14* | (2006.01) |

(52) U.S. Cl.
CPC .............. *B64C 19/00* (2013.01); *B64D 43/00* (2013.01); *B64D 47/00* (2013.01); *G06F 3/04817* (2013.01); *G06F 3/14* (2013.01); *G06F 11/0739* (2013.01); *G06F 21/31* (2013.01); *H04L 67/12* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 5,978,715 | A | * | 11/1999 | Briffe et al. .................... 701/11 |
| 8,255,112 | B2 | * | 8/2012 | Conzachi et al. ........... 701/31.5 |
| 2005/0202852 | A1 | * | 9/2005 | Wada ................. H04M 1/6091 455/569.1 |

(Continued)

OTHER PUBLICATIONS

Federal Aviation Administration, Advisory Circular Guidelines for the Certification, Airworthiness, and Operational Use of Electronic Flight Bags, AC No. 120-76B. Published Jun. 1, 2012.*

(Continued)

*Primary Examiner* — Rami Khatib
*Assistant Examiner* — Jeffrey Boomer
(74) *Attorney, Agent, or Firm* — Donna P. Suchy; Daniel M. Barbieri

(57) ABSTRACT

A computer-implemented method includes determining via a processor in an avionics system that a personal electronic device is in communication with the avionics system, and establishing a limitation on the functionality of the personal electronic device with respect to the avionics system via the processor.

20 Claims, 3 Drawing Sheets

(56) References Cited

U.S. PATENT DOCUMENTS

| | | | | |
|---|---|---|---|---|
| 2006/0230315 A1* | 10/2006 | Moyer | ............................ | 714/30 |
| 2007/0055416 A1* | 3/2007 | Allen | ................................ | 701/3 |
| 2007/0127460 A1* | 6/2007 | Wilber et al. | ................. | 370/389 |
| 2008/0004040 A1* | 1/2008 | Bogart | ........................ | 455/456.1 |
| 2008/0208399 A1* | 8/2008 | Pham | ..................... | G01C 23/00 701/4 |
| 2008/0282356 A1* | 11/2008 | Grabarnik | ................ | G06F 21/84 726/26 |
| 2009/0133112 A1* | 5/2009 | Kauffman et al. | ............... | 726/11 |
| 2009/0280858 A1* | 11/2009 | Ahn | ................... | H04M 1/72577 455/550.1 |
| 2010/0105329 A1* | 4/2010 | Durand et al. | ............... | 455/41.2 |
| 2010/0287601 A1* | 11/2010 | Croize | .................... | G06F 21/34 726/4 |
| 2011/0004832 A1* | 1/2011 | Canal | ..................... | G06Q 30/06 715/758 |
| 2011/0065375 A1* | 3/2011 | Bradley | ............. | H04M 1/72577 455/1 |
| 2012/0236784 A1* | 9/2012 | Lynch | ................. | H04B 7/18508 370/316 |
| 2013/0063612 A1* | 3/2013 | Royster | .............. | H04N 21/2146 348/207.99 |
| 2013/0064151 A1* | 3/2013 | Mujtaba | ................ | H04B 7/0817 370/311 |
| 2013/0232237 A1* | 9/2013 | Zulch et al. | ................... | 709/220 |
| 2014/0197981 A1* | 7/2014 | Hartley | .................... | G01S 13/74 342/37 |
| 2014/0283142 A1* | 9/2014 | Shepherd | .............. | G06F 3/0482 726/30 |
| 2015/0074615 A1* | 3/2015 | Han | .................... | G06K 9/00033 715/863 |
| 2016/0349933 A1* | 12/2016 | Owczarski | ............... | H04L 12/24 |

OTHER PUBLICATIONS

Federal Aviation Administration, Electronic Flight Bag (EFB) Policy & Guidance Information, Paper #263, Presented in Oct. 2011.*

Skaves, Peter, Electronic Flight Bag (EFB) Policy and Guidance. Federal Aviation Administration. Presented Oct. 16-20, 2011.*

* cited by examiner

SYSTEM AND METHOD FOR AVIONICS INTEGRITY AND PROTECTION

BACKGROUND

Flight deck usage of personal electronic devices, such as tablet devices or other commercial off-the-shelf (COTS) devices (collectively referred to herein as "PEDs"), is currently limited to certain electronic flight bag functions. For example, while Federal Aviation Administration (FAA) regulations currently permit the use of PEDs for communicating certain information to an avionics system, the use of PEDs to display own-ship position or to function as flight deck multi-function displays is prohibited. This is due in part to the lower assumed data integrity of PEDs. For example, a typical avionics system may have a maximum error rate of 1.0 E-5/hour, with safety-critical systems having maximum error rates better than 1.0 E-9/hour. most PEDs and other COTS devices, however, have a maximum error rate of about 1.0 E-3/hour. This low level of data integrity could potentially lead to hazardously misleading data or a hazardous situation on an aircraft. Another concern is that a rogue or virus-induced PED may attempt to perform undesirable functions on the flight deck that cannot be detected by aircraft personnel, such as interfering with critical functions of the primary, multi-function, or other displays, editing or executing flight plans, or activating critical circuit breakers. There is an ongoing need for improved systems and methods for avionics integrity and protection that may allow a higher degree of interaction between PEDs and flight deck avionics, and that may allow PEDs to perform a wider range of functions, such as flight planning and data loading or cursor control and text entry.

SUMMARY

According to an exemplary embodiment, a computer-implemented method includes determining via a processor in an avionics system that a personal electronic device is in communication with the avionics system, and establishing a limitation on the functionality of the personal electronic device with respect to the avionics system via the processor.

According to another exemplary embodiment, a computer-implemented method includes transmitting avionics data from an avionics system to a personal electronic device, determining an expected response to the avionics data from the personal electronic device via a processor in the avionics system, receiving an actual response to the avionics data from the personal electronic device, comparing the actual response to the expected response, and determining a data integrity level of the personal electronic device based on the comparison.

According to another exemplary embodiment, an avionics system includes a flight deck display, an avionics user interface device, and an electronic avionics controller in communication with the flight deck display via a first interface and with the avionics user interface device via a second interface. The avionics controller has a third interface configured for communication with a personal electronic device. The avionics controller further has a processor and machine readable storage media having instructions stored therein that, when executed by the processor, cause the processor to determine that the personal electronic device is in communication with the avionics controller, to establish a limitation on the functionality of the personal electronic device with respect to the avionics system, to transmit avionics data to the personal electronic device, to determine an expected response to the avionics data from the personal electronic device, to receive an actual response to the avionics data from the personal electronic device, to compare the actual response to the expected response, and to determine a data integrity level of the personal electronic device based on the comparison.

DETAILED DESCRIPTION

Figure 1:
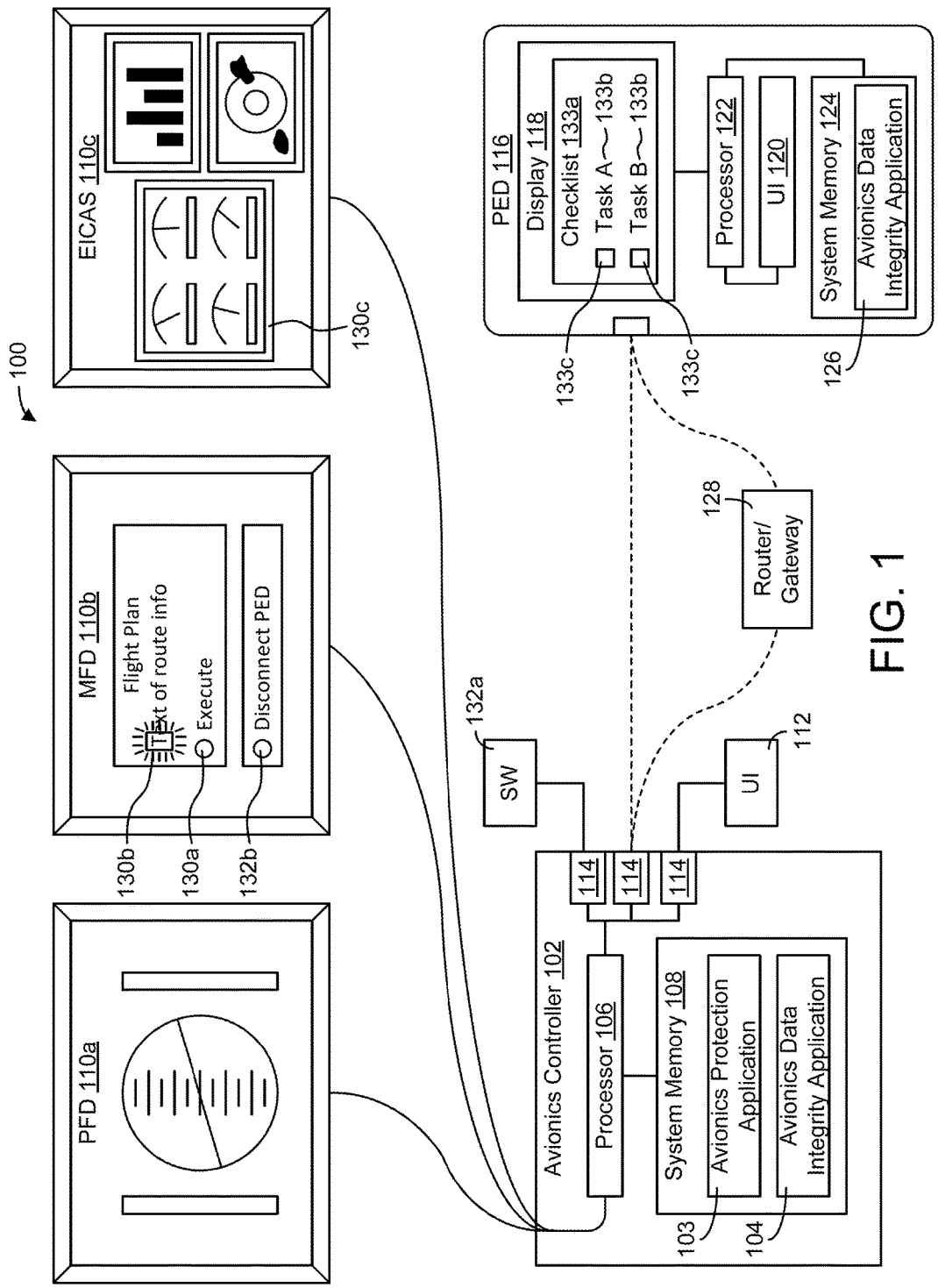
FIG. 1 is block diagram illustrating a system for providing avionics integrity and protection according to an exemplary embodiment.

According to various exemplary embodiments, an avionics system may be protected by determining that a PED is in communication with the avionics system and establishing a limitation on the functionality of the personal electronic device with respect to the avionics system. For example, the avionics system may limit the function of the PED by preventing the PED from interacting with one or more components of the avionics system, such as a flight deck display for a critical function, or from interacting with particular graphical elements such as a button, cursor, window, or other particular item for a critical avionics application displayed on a flight deck display. In this way, crucial avionics components, functions or display areas may only be controlled by a certified avionics user interface, such as a cursor control device. The avionics system may also limit the functionality of the PED based on, for example, an aircraft parameter such as aircraft speed, a weight on wheels condition, or a particular flight phase. The avionics system may also limit the functionality of the PED by granting priority over the personal electronics device to a certified user interface device in communication with the avionics system. The avionics system may also, for example, enable a switch configured to break communications between the avionics system and the PED. As will be appreciated, limiting the functionality of the PED according to the various exemplary embodiments may prevent a rogue or virus-induced PED from performing undesirable functions in critical flight deck applications that cannot be detected by aircraft personnel, such as interfering with the flight deck displays, executing flight plans, or activating critical circuit breakers.

According to other exemplary embodiments, a higher-integrity avionics system may ensure data integrity when interacting with a lower-integrity PED, such as where an avionics system instructs the PED to display an interactive electronic checklist. A higher-integrity avionics system transmitting avionics data to a lower-integrity PED may determine an expected response to the avionics data from the PED. For example, the avionics system may determine an expected response from the PED that includes color data, line data, shape data, location data, final text character data, intermediate state data, and state transition data for graphical items to be displayed by the PED. The avionics system may receive feedback in the form of an actual response to the avionics data from the PED representative of what was calculated or displayed by the PED. The avionics system may compare the actual response to the expected response. The avionics system may also determine a data integrity level of the PED based on the comparison. If, for example, the avionics system is expecting particular color data from the PED, but does not receive the same color data in the actual response from the PED, the avionics system may determine that there has been a loss of data integrity at the PED. When the avionics system has determined a loss of data integrity at the PED, the avionics system may limit the functionality of the PED with respect to the avionics system. For example, the avionics system may discontinue transmission of avionics data to the PED, transmit a reset command to the PED, or display a warning message on a flight deck display. As will be appreciated, using a high-integrity avionics system to monitor actual responses from a PED and compare them with expected responses in order to determine a level of data integrity for the PED according to the various exemplary embodiments may prevent a loss of data integrity from leading to hazardously misleading data or a hazardous situation on an aircraft.

According to various other exemplary embodiments, the various aspects of the avionics protection and data integrity embodiments described herein may be variously combined. As will be appreciated, the various aspects of avionics protection and data integrity embodiments described herein may allow a higher degree of interaction between PEDs and avionics systems given the reduced risk of a PED performing undesirable functions on critical flight deck applications that cannot be detected by aircraft personnel. These various aspects may further allow PEDs to support a wider range of avionics functions, such as flight planning and data loading or cursor control and text entry, given the reduced risk of a loss of data integrity leading to hazardously misleading data or a hazardous situation on an aircraft.

FIG. 1 is a block diagram illustrating a system 100 for providing avionics integrity and protection according to an exemplary embodiment. System 100 may be, for example, an avionics system that includes one or more avionics controllers 102. Avionics controller 102 may be, for example, a device using ARINC 429, ARINC 629, and ARINC 661 protocols and standards to manage onboard avionics data and graphics applications. Avionics controller 102 may be configured as a single integrated unit, or as multiple avionics controllers 102 having distributed functionality utilizing, for example, integrated modular avionics (IMA). Avionics controller 102 may be configured to implement, for example, a flight management system (FMS), an electronic flight instrumentation system (EFIS), an integrated flight information system (IFIS) as well as EICAS, TCAS and other avionics functions. According to an exemplary embodiment, avionics controller 102 may include an avionics protection application 103 and an avionics data integrity application 104.

Avionics controller 102 may include a processor 106, a system memory 108 and a system bus that couples various system components including system memory 108 to processor 106. Processor 106 may be implemented in hardware, firmware, software, or any combination of these methods. Avionics controller 102 may have one or more processors 106 that use the same or a different processing technology. Additionally, processor 106 may be a separate component of avionics controller 102 or may be embedded within another component of avionics controller 102. Processor 106 may execute instructions that may be written using one or more programming languages, scripting languages, assembly languages, etc. The instructions may be carried out by, for example, a special purpose computer, logic circuits, or hardware circuits. The term "execute" is the process of running an application or the carrying out of the operation called for by an instruction. Processor 106 may execute avionics protection application 103, avionics data integrity application 104, and/or other instructions.

System memory 108 may be, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise random access memory (RAM), read only memory (ROM), erasable programmable read only memory (EPROM), electrically erasable programmable memory (EEPROM), CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. Avionics controller 102 may have one or more system memories 108 that use the same or a different memory technology. System memory 108 may store avionics protection application 103 and avionics data integrity application 104 in addition to other instructions or information.

System 100 may also include one or more displays 110 in communication with avionics controller 102. Display 110 may be, for example, an AFD-2100 Adaptive Flight Display manufactured by Rockwell Collins, Inc. and configured for use in flight deck display applications. According to an exemplary embodiment, display 110 is configured to operate using an architecture compliant with the ARINC 661 standard for cockpit display systems (CDS). Display 110 may be configured to function as, for example, a primary flight display (PFD) 110a used to display altitude, airspeed, vertical speed, navigation and traffic collision avoidance system (TCAS) advisories. Display 110 may also be configured to function as, for example, a multi-function display 110b used to display navigation maps, weather radar, electronic charts, TCAS traffic, aircraft maintenance data and electronic checklists, manuals, and procedures. Flight deck display 110 may also be configured to function as, for example, an engine indicating and crew-alerting system (EICAS) display 110c used to display critical engine and system status data. Other types and functions of display 110 are contemplated as well.

System 100 may also include one or more user interface devices 112 in communication with avionics controller 102. User interface device 112 may be, for example, a computer with a monitor, touch screen, keyboard, a keypad, a mouse, joystick or other input devices performing a similar function. According to an exemplary embodiment, user interface device 112 is a cursor control device (CCD) or multi-function key pad certified for use with avionics systems. User interface device 112 may be configured to, for example, allow an aircraft crew member to interact with various avionics applications and perform functions such as data entry, manipulation of navigation maps, and moving among and selecting checklist items.

According to an exemplary embodiment, avionics controller 102 may be configured to communicate with display 110 and user interface device 112 as well as other devices via one or more data interfaces 114. Data interface 114 may be, for example, a high-speed internal data bus having one or more device connection sockets or ports, or an external network that may be either wired or wireless. According to an exemplary embodiment, data interface 114 may be a data bus using ARINC 429 protocols and standards and having one or more appropriately configured device connection sockets or ports, such as Universal Serial Bus (USB) 2.0 or 3.0 compliant connection ports or an Ethernet connection, or a wireless interface, such as a Wi-Fi or Bluetooth adapter. According to another exemplary embodiment, multiple device-dedicated ARINC 429 data buses may be used such that avionics controller 102 may distinguish among input signals from various system components communicating via data interface 114.

Avionics controller 102 may be configured to communicate with a PED 116 via data interface 114. PED 116 may be, for example, a tablet device, laptop computer or other COTS device. PED 116 may include a display 118, a user interface 120, a processor 122, a system memory 124, and a system bus that couples various system components including system memory 124 to processor 122. Display 118 may be, for example, an LED or LCD display which may also include a touch screen. User interface 120 may include, for example, a keyboard, a keypad, a mouse, joystick or other input devices performing a similar function.

Processor 122 may be implemented in hardware, firmware, software, or any combination of these methods. PED 116 may have one or more processors 122 that use the same or a different processing technology. Additionally, processor 122 may be a separate component of PED 116 or may be embedded within another component of PED 116. Processor 122 may execute instructions that may be written using one or more programming languages, scripting languages, assembly languages, etc. The instructions may be carried out by, for example, a special purpose computer, logic circuits, or hardware circuits. Processor 122 may execute, for example, an avionics data integrity application 126 stored in system memory 124, and/or other instructions.

System memory 124 may include, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine. PED 116 may have one or more system memories 124 that use the same or a different memory technology. System memory 124 may store avionics data integrity application 126 in addition to other instructions or information.

PED 116 may communicate with avionics controller 102 using, for example, a wired connection to data interface 114, such as a USB 2.0 or 3.0 compliant connection. PED 116 may also communicate with avionics controller 102 using a wireless connection to data interface 114, such as a Wi-Fi or Bluetooth adapter, that may be further facilitated by the use of a router or gateway 128. According to an exemplary embodiment, PED 116 may communicate with avionics controller 102 via a device-dedicated data interface 114, such as a device-dedicated ARINC 429 data bus such that avionics controller 102 may distinguish between communications from PED 166, and, for example, a user interface device 112, such as a certified avionics cursor control device communicating with avionics controller 102.

As stated above, avionics controller 102 may include an avionics protection application 103 stored in system memory 108. Avionics protection application 103 may be, for example, one or more program modules including routines, programs, objects, components, data structures, etc. that perform particular tasks or implement particular abstract data types. Avionics protection application 103 may be written using, for example, one or more programming languages, assembly languages, scripting languages, etc. According to an exemplary embodiment, avionics protection application 103 may be an organized set of instructions that, when executed, cause processor 106 to determine that PED 116 is in communication with avionics controller 102 and establish one or more limitations on the functionality of PED 116 with respect to system 100.

Processor 106 may determine that PED 116 is in communication with system 100 by identifying PED 116 upon connection to data interface 114. For example, PED 116 may be connected to avionics controller 102 via a device-dedicated data interface 114, such as a device-dedicated ARINC 429 data bus having an appropriately configured USB 2.0 or 3.0 compliant connection socket or port. Processor 106 may command an appropriate driver to scan data interface 114 upon detecting the connection to PED 116 and obtain device identity and description information from PED 116.

Avionics protection application 103 may establish one or more limitations on the functionality of PED 116 with respect to system 100 in a number of ways. According to an exemplary embodiment, avionics protection application 103 may limit the functionality of PED 116 by instructing processor 106 to prevent PED 116 from interacting with one or more components of system 100, such as one or more of displays 110. For example, avionics protection application 103 may instruct processor 106 to prevent PED 116 from interacting with PFD display 110a so that PED 116 may not access, manipulate, or display critical altitude, airspeed, vertical speed, navigation, or TCAS information. Such information would only be accessible by a user interface 112, such as a certified avionics cursor control device.

According to another exemplary embodiment, avionics protection application 103 may limit the functionality of PED 116 by instructing processor 106 to prevent PED 116 from interacting with one or more graphical elements 130 such as a button 130a, cursor 130b, window 130c, or other particular items displayed on one or more displays 110, particularly where critical avionics functions are involved. For example, avionics protection application 103 may instruct processor 106 to prevent PED 116 from interacting with a particular EICAS window 130c displayed on EICAS display 110c so that PED 116 may not access, manipulate, or display any critical engine and system status information displayed in these windows, but may otherwise interact with other displayed screen items. The particular graphical elements 130 that PED 116 may not access would only be accessible by, for example, a user interface device 112, such as a certified avionics cursor control device. For example, button 130a displayed in MFD display 110b for executing a flight plan would only be accessible by a user interface device 112 such as a certified avionics cursor control device, and could not be accessed by PED 116. Similarly, cursor 110b for editing the flight plan displayed in MFD display 110b would only be accessible by a user interface device 112 such as a certified avionics cursor control device, and could not be accessed by PED 116. Other examples may include allowing PED 116 to access graphical elements for normal condition checklists, but not for abnormal condition checklists.

According to another exemplary embodiment, avionics protection application 103 may instruct processor 106 to limit the functionality of PED 116 with respect to system 100 based on a particular aircraft parameter such as aircraft speed, a weight on wheels condition, or a particular flight phase. For example, avionics protection application 103 may instruct processor 106 to limit the functionality of PED 116 during takeoff and landing procedures, or to allow PED 116 to perform data entry tasks for system 100 during a weight on wheels condition, but to limit the functionality of PED 116 to data review tasks during flight or at a particular speed or altitude during flight.

According to another exemplary embodiment, avionics protection application 103 may instruct processor 106 to grant priority over PED 116 to a user interface device 112, such as a certified avionics cursor control device, in the event of a conflict between PED 116 and user interface device 112. For example, if both PED 116 and user interface device 112 are attempting to perform the same data entry task, avionics protection application 103 may instruct processor 106 to grant priority over PED 116 to user interface device 112.

According to another exemplary embodiment, avionics protection application 103 may instruct processor 106 to enable a switch 132 configured to break communications between avionics controller 102 and PED 116. Switch 132 may be, for example, a dedicated manual switch 132a, or a button 132b displayed on a display 110 and selectable only by user interface device 112.

As stated above, avionics controller 102 may further include an avionics data integrity application 104 stored in system memory 108 and executable by processor 106. Avionics data integrity application 104 may be, for example, one or more program modules including routines, programs, objects, components, data structures, etc. that perform particular tasks or implement particular abstract data types. Avionics data integrity application 104 may be written using, for example, one or more programming languages, assembly languages, scripting languages, etc. Avionics data integrity application 104 may be a separate application, or may be integrated with other applications residing on avionics controller 102. According to an exemplary embodiment, avionics data integrity application 104 may be an organized set of instructions configured to implement ARINC 661 protocols and standards. These instructions, when executed, may cause processor 106 to ensure data integrity when system 100 is interacting with a lower-integrity PED 116 to, for example, facilitate display of graphical elements 133 on PED 116, such as an interactive electronic checklist. In particular, avionics data integrity application 104 may instruct processor 106 to determine an expected response to avionics data transmitted to PED 116, to monitor feedback from PED 116 in the form of an actual response by PED 116 to the avionics data, to compare the actual response to the expected response, and to determine a data integrity level of PED 116 based on the comparison.

As further stated above, PED 116 may further include an avionics data integrity application 126 stored in system memory 124 and executable by processor 122. Avionics data integrity application 126 may be, for example, one or more program modules including routines, programs, objects, components, data structures, etc. that perform particular tasks or implement particular abstract data types. Avionics data integrity application 126 may be written using, for example, one or more programming languages, assembly languages, scripting languages, etc. Avionics data integrity application 126 may be a separate application, or may be integrated with other applications residing on PED 116. According to an exemplary embodiment, avionics data integrity application 126 may be an organized set of instructions configured to implement ARINC 661 protocols and standards such that, when executed, cause processor 122 to provide feedback to avionics controller 102 regarding actual information calculated or displayed by PED 116 in response to avionics data received from avionics controller 102.

During interactions between avionics controller 102 and PED 116, avionics controller 102 may transmit avionics data to PED 116 including instructions to, for example, display one or more graphical elements 133. For example, avionics controller 102 may instruct PED 116 to display an interactive electronic checklist format 133a comprising a series of line items 133b defining a particular flight procedure, such as a start engine procedure. Each line item 133b may describe a particular task that must be completed during the procedure. A user, such as a pilot, may use PED 116 to view the electronic checklist on display 118, and to interact with the checklist by checking off a button or check box 133c corresponding to each line item 133b as it is completed using user interface 120. Avionics data integrity application 104 may develop a specific definition of what must be displayed by PED 116 using, for example, ARINC 661 standards and protocols. This definition may include, for example, instructions for specific lines, shapes, colors, locations, text, and other graphical elements 133 required for PED 116 to create and display the checklist format. This definition may be used to transmit, for example, various graphics instructions from avionics controller 102 to PED 116.

Avionics data integrity application 104 may also determine an expected response from PED 116 to avionics data transmitted from avionics controller 102. The expected response may contain all or a subset of the data used to define an action to be taken by PED 116, such as data defining a graphical element 133 of a checklist format 133a to be displayed on PED 116. For example, avionics data integrity application 104 may determine an expected response from PED 116 that includes a subset of line data, shape data, color data, location data, final text character data, and other data for graphical items 133 in a checklist format 133a to be displayed by PED 116. The number and type of data points included in the expected response may vary depending on the level of data integrity required for the particular task being performed by PED 116. For example, avionics data integrity application 104 may determine an expected response having one or more data points from an electronic checklist display format (e.g., one data point per checklist item) to support an allowable error rate of 1.0 E-5/hour for a Design Assurance Level C (DAL-C) application.

PED 116 may receive avionics data from avionics controller 102 including, for example, various graphics instructions to display an electronic checklist format 133a. Avionics data integrity application 126 may interpret the various graphics instructions and respond accordingly to, for example, display one or more graphical elements 133 for the electronic checklist format 133a on display 118. Avionics data integrity application 126 may also determine feedback for avionics controller 102 in the form of an actual response to the avionics data received from avionics controller 102. The actual response may include, for example, data representative of what was calculated or displayed by PED 116. Actual data for each data point may be acquired by avionics data integrity application 126 from, for example, pixel data acquired from a screen capture from display 118, or from graphics commands, input parameters, intermediate states and function call results generated by avionics data integrity application 126. Such data may include, for example, data from PED 116 corresponding to the number and types of data points included in the expected response determined by avionics data integrity application 104. For example, if avionics data integrity application 104 has determined three expected data points for each of a color, line, and final text character for a particular electronic checklist display format 133*a*, then avionics data integrity application 126 may determine actual data for each of these data points as displayed by PED 116.

Avionics data integrity application 104 may receive feedback from PED 116 in the form of an actual response to avionics data received from avionics controller 102 and may compare the actual response to an expected response. For example, avionics data integrity application 104 may receive an actual response from PED 116 containing three actual data points for each of a color, line, and final text character for a particular electronic checklist display format 133*a* displayed by PED 116 in response to data received by PED 116 from avionics controller 102. Avionics data integrity application 104 may compare these actual data points from PED 116 with three expected data points for each of a color, line, and final text character for the electronic checklist display format 133*a* as determined by avionics data integrity application 104.

Avionics data integrity application 104 may determine a data integrity level for PED 116 based on a comparison of an actual response received from PED 116 with an expected response determined by avionics data integrity application 104. For example, avionics data integrity application 104 may determine three expected data points for each of a color, line, and final text character for a particular electronic checklist display format 133*a* to be displayed by PED 116. Avionics data integrity application 104 may, however, receive three actual data points for each of a color, line, and final text character for the electronic checklist display format as displayed by PED 116, one or more of which does not match the expected value as determined by avionics data integrity application 104. Avionics data integrity application 104 may accordingly determine that there has been a loss of data integrity at PED 116.

When avionics data integrity application 104 has determined a loss of data integrity at PED 116, avionics data integrity application 104 may limit the functionality of PED 116 with respect to system 100. For example, avionics data integrity application 104 may disregard input from PED 116, discontinue transmission of avionics data to PED 116, transmit a reset command to PED 116, or display a warning message on display 110 indicating that there has been a loss of data integrity at PED 116.

Avionics data integrity application 104 may alternatively receive three actual data points for each of a color, line, and final text character for the electronic checklist display format as displayed by PED 116, each of which matches the expected response value as determined by avionics data integrity application 104. Avionics data integrity application 104 may, accordingly, determine that there is no loss of data integrity at PED 116 and proceed with interactions with PED 116.

While many of the foregoing embodiments have been described in the context of comparing expected and actual graphical data to determine the integrity of a device displaying graphical elements, non-graphical or combined graphical and non-graphical interactions between avionics controller 102 and PED 116 are contemplated as well. For example, in the context of an embodiment where avionics controller 102 is interacting with PED 116 to display an interactive electronic checklist 133*a*, avionics data integrity application 104 may determine an expected response from PED 116 including, for example, an expected state response, allowable state transitions, and an expected response format in addition to line data, shape data, color data, location data, final text character data, and other data for graphical items 133 in a checklist format 133*a*. Specifically, the expected response may include, for example, data regarding the number and location of selectable buttons or check boxes 133*c* in the checklist format 133*a* as well as an expected state response and allowable transition for each that may allow avionics data integrity application 104 to determine whether a particular button or check box 133*c* is currently permitted to be selected or checked off by a crew member.

Avionics data integrity application 104 may receive feedback from PED 116 in the form of an actual response indicating, for example, that a graphical item 133, such as a button or check box 133*c* in an electronic interactive checklist format 133*b* displayed on PED 116 has been selected by a crew member. This additional feedback may include, for example, data acquired by avionics data integrity application 126 indicating an actual location on display 118 where a selection was made, as well as an actual state change request for the button or check box 133*c* to transition from, for example, an unselected state to a selected state indicating that the corresponding task has been completed.

Avionics data integrity application 104 may compare an actual response to an expected response. For example, avionics data integrity application 104 may compare an actual response indicating an actual location on display 118 where a selection was made, as well as an actual state change request for the button or check box 133*c* to transition from, for example, an unselected state to a selected state to an expected response to confirm that the location where the selection was made corresponds graphically to the particular checklist button or check box 133*c*, and that the button or check box 133*c* is in an active state, and that a transition from unselected to selected is allowable.

Avionics data integrity application 104 may determine a data integrity level for PED 116 based on a comparison of an actual response received from PED 116 with an expected response determined by avionics data integrity application 104. For example, avionics data integrity application 104 may determine that an actual location on display 118 where a selection was made does not correspond graphically to the expected location of a particular checklist button or check box 133*c* as defined by avionics data integrity application 104. Avionics data integrity application 104 may accordingly determine that there has been a loss of data integrity at PED 116.

Other embodiments may include for example, enabling PED 116 to display own ship location for an aircraft or to perform electronic switch control tasks. To facilitate display of own ship location on PED 116, avionics data integrity application 104 may, for example, determine an expected latitude and longitude as offsets with respect to a reference point on a map or chart. Avionics data integrity application 104 may compare the expected response with an actual displayed position on display 118 of PED 116. Avionics data integrity application 126 may derive the actual response from graphics data used to display the aircraft position on display 118 of PED 116. Avionics data integrity application 104 may determine a loss of data integrity at PED 116 if the actual displayed location does not match the expected location and respond accordingly.

Similarly, avionics data integrity application 104 may facilitate electronic switch control tasks by determining an expected number and location of electronic switches or circuit breakers as well as an expected state response and allowable transition for each. Avionics data integrity application 104 may compare the expected response with an actual response from PED 116 indicating, for example, an actual location on display 118 where a selection was made, as well as an actual state change request for a switch or circuit breaker to transition from, for example, an open state to a closed state. Avionics data integrity application 126 may derive the actual response from, for example, graphics data as well as other non-graphical switch control application data.

Avionics controller 102 may also implement additional techniques via avionics data integrity applications 104 and 126 in order to determine a level of data integrity for PED 116. For example, data buffers and time period thresholds may be implemented to ensure that communications between avionics controller 102 and PED 116 do not and have not stalled, or strike counters may be employed to manage nuisance faults. Cyclic redundancy checks with, for example, data patters unknown to PED 116, may also be implemented to ensure that PED 116 may not introduce undetectable errors.

Figure 2:
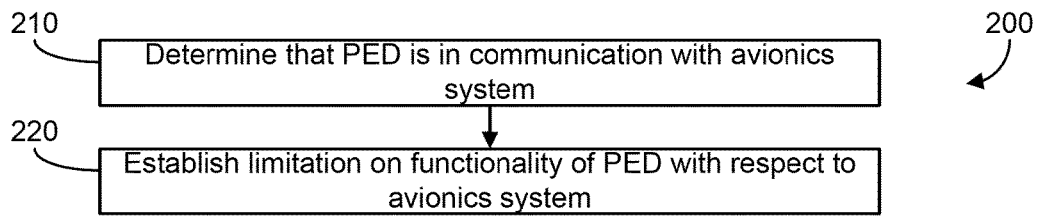
FIG. 2 is a flowchart of a process for providing avionics protection according to an exemplary embodiment.

FIG. 2 is a flowchart of a process 200 for providing avionics protection according to an exemplary embodiment. At a step 210, a processor may determine that a PED is in communication with an avionics system. For example, a PED may be connected to an avionics controller via a device-dedicated data interface, such as a device-dedicated ARINC 429 data bus having an appropriately configured USB 2.0 or 3.0 compliant connection socket or port. The processor may command an appropriate driver to scan the data interface upon detecting the connection to the PED and obtain device identity and description information from the PED.

At a step 220, the processor may establish a limitation on the functionality of the personal electronic device with respect to the avionics system. For example, the avionics system may limit the function of the PED by preventing the PED from interacting with one or more components of the avionics system, such as a flight deck display for a critical function, or from interacting with particular graphical elements such as a button, cursor, window, or other particular item for a critical avionics application displayed on a flight deck display. In this way, crucial avionics components, functions or display areas may only be controlled by, for example, a certified avionics user interface, such as a cursor control device. The avionics system may also limit the functionality of the PED based on, for example, an aircraft parameter such as aircraft speed, a weight on wheels condition, or a particular flight phase. The avionics system may also limit the functionality of the PED by granting priority over the PED to a certified user interface device in communication with the avionics system. The avionics system may also, for example, enable a switch configured to break communications between the avionics system and the PED.

Figure 3:
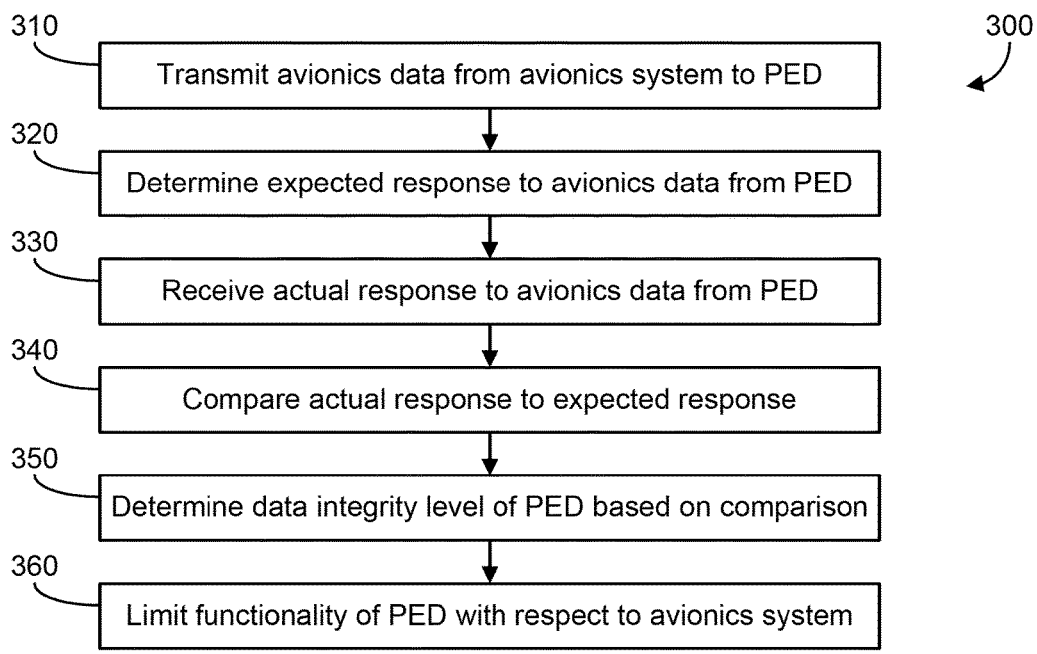
FIG. 3 is a flowchart of a process for providing avionics integrity according to an exemplary embodiment.

FIG. 3 is a flowchart of a process 300 for providing avionics integrity according to an exemplary embodiment. At a step 310, an avionics system may transmit avionics data to a PED. At a step 320, the avionics system may determine an expected response to the avionics data from the PED via a processor in the avionics system. For example, the avionics system may determine an expected response from the PED that includes color data, line data, shape data, location data, final text character data, intermediate state data, and/or state transition data for graphical items to be displayed by the PED.

At a step 330, the avionics system may receive an actual response to the avionics data from the PED. The actual response may be representative of what was calculated or displayed by the PED. Actual data may be from, for example, pixel data acquired from a screen capture from the PED, or from graphics commands, input parameters, intermediate states and function call results generated by the PED. Such data may include, for example, data from the PED corresponding to the number and types of data points included in an expected response determined by the avionics system.

At a step 340, the avionics system may compare the actual response to the expected response. At a step 350, the avionics system may determine a data integrity level of the PED based on the comparison. If, for example, the avionics system is expecting particular color data from the PED, but does not receive the same color data in the actual response from the PED, the avionics system may determine that there has been a loss of data integrity at the PED.

At a step 360, the avionics system may limit the functionality of the PED with respect to the avionics system if the avionics system has determined a loss of data integrity at the PED. For example, the avionics system may discontinue transmission of avionics data to the PED, transmit a reset command to the PED, or display a warning message on a flight deck display.

Figure 4:
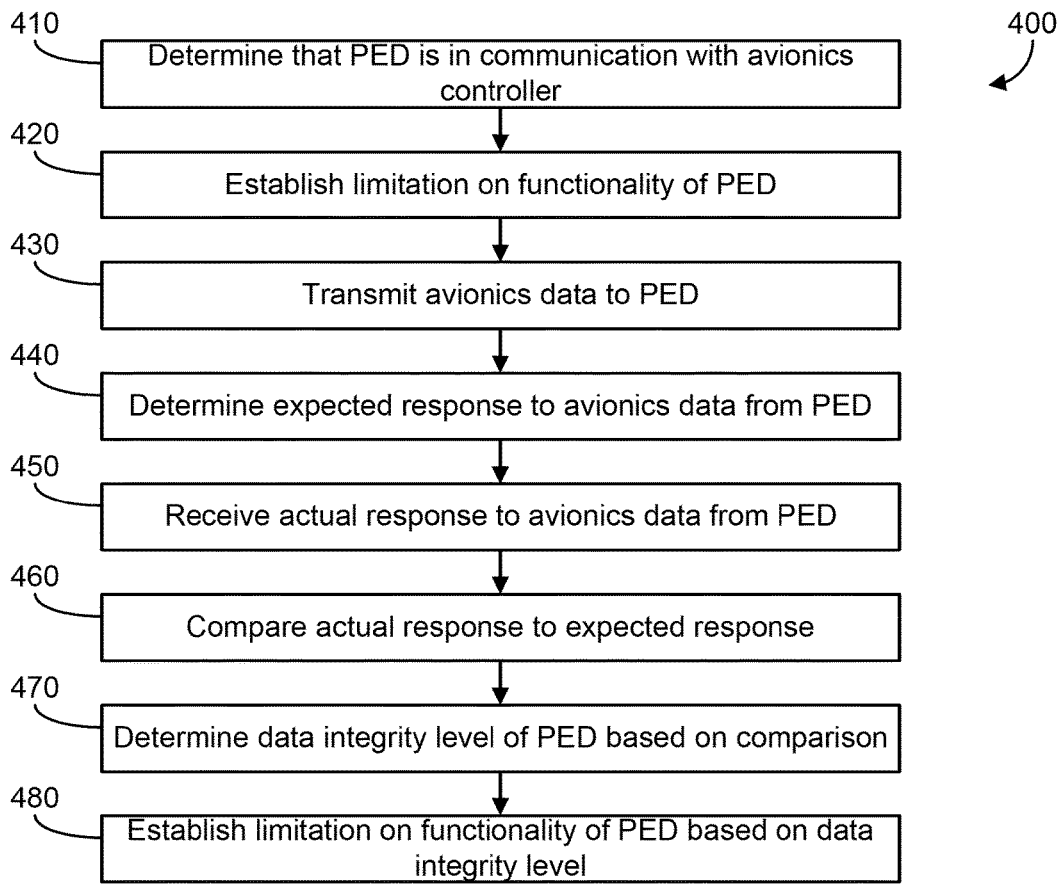
FIG. 4 is a flowchart of a process for providing avionics integrity and protection according to an exemplary embodiment.

FIG. 4 is a flowchart of a process 400 for providing avionics integrity and protection according to an exemplary embodiment. At a step 410, a processor may determine that a PED is in communication with an avionics system. At a step 420, the processor may establish a limitation on the functionality of the PED with respect to the avionics system. At a step 430, an avionics system may transmit avionics data to the PED. At a step 440, the avionics system may determine an expected response to the avionics data from the PED via a processor in the avionics system. At a step 450, the avionics system may receive an actual response to the avionics data from the PED. At a step 460, the avionics system may compare the actual response to the expected response. At a step 470, the avionics system may determine a data integrity level of the PED based on the comparison. At a step 480, the avionics system may limit the functionality of the PED with respect to the avionics system if the avionics system has determined a loss of data integrity at the PED.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. An avionics system, comprising:
an aircraft cockpit display;
an avionics user interface device; and
an electronic avionics controller in communication with the aircraft cockpit display via a first interface and with the avionics user interface device via a second interface, and having a third interface configured for communication with a personal electronic device, the controller further having a processor and machine readable storage media having instructions stored therein that, when executed by the processor, cause the processor to:
display a graphical element on the aircraft cockpit display;
determine that the personal electronic device is in communication with the avionics controller;
after displaying the graphical element, establish a limitation on the functionality of the personal electronic device with respect to the avionics system, wherein the limitation includes preventing the personal electronic device from interacting with the graphical element by granting priority over the personal electronics device to the avionics user interface device such that an instruction to manipulate the graphical element from the avionics user interface device takes priority over an instruction to manipulate the graphical element from the personal electronic device;
transmit avionics data including graphics instructions to the personal electronic device;
determine an expected response to the avionics data from the personal electronic device, the expected response including at least one of a graphics response or a state change response;
receive an actual response to the avionics data from the personal electronic device, the actual response determined based on the graphics instructions, and the actual response including at least one of an actual graphics response or an actual state change response;
compare the actual response to the expected response;
determine a data integrity level of the personal electronic device based on the comparison; and
display a message on the aircraft cockpit display in response to the data integrity level indicating that a loss of data integrity of the personal electronic device has occurred.

2. The system of claim 1, further comprising a switch configured to be selectable by a user via the avionics user interface device and configured to break communications between the avionics controller and the personal electronic device when selected by the user, the switch being inaccessible via the personal electronic device.

3. The system of claim 1, wherein the instructions are configured to establish the limitation by preventing the personal electronic device from interacting with a first display area of the aircraft cockpit display while permitting the personal electronic device to interact with a second display area of the aircraft cockpit display.

4. The system of claim 1, wherein the instructions are configured to establish the limitation by preventing the personal electronic device from interacting with a first graphical element displayed on the aircraft cockpit display while permitting the personal electronic device to interact with a second graphical element displayed on the aircraft cockpit display.

5. The system of claim 4, wherein the graphical element is one of a button, a cursor, and a window.

6. The system of claim 1, wherein the instructions are configured to establish the limitation based on an aircraft parameter.

7. The system of claim 6, wherein the aircraft parameter is one of an aircraft speed, a weight on wheels state, and an aircraft phase of flight, and wherein the aircraft phase of flight is one of a takeoff phase and a landing phase.

8. The system of claim 1, wherein granting priority over the personal electronics device to the avionics user interface device is based on the personal electronics device and the avionics user interface device attempting to perform a same task, and wherein the task is a data entry task.

9. The system of claim 1, wherein the instructions are configured to determine the data integrity level of the personal electronic device by implementing one of a strike count function, a time delay threshold, and a cyclic redundancy check.

10. The system of claim 1, wherein the avionics data includes one of graphics command data, image data, circuit breaker state data, and data link message data.

11. The system of claim 1, wherein the expected response includes one of color data, line data, shape data, location data, final text character data, intermediate state data, and state transition data.

12. The system of claim 1, wherein the actual response is based on one of pixel data, graphics command data, intermediate state data and state transition data.

13. A computer-implemented method, comprising:
determining via a processor in an avionics system that a personal electronic device is in communication with the avionics system;
displaying a graphical element on an aircraft cockpit display;
after displaying the graphical element, establishing a limitation on the functionality of the personal electronic device with respect to the avionics system via the processor, wherein the limitation includes preventing the personal electronic device from interacting with the graphical element by granting priority over the personal electronics device to an avionics user interface device when both the personal electronics device and the avionics user interface device attempt to interact with the at least one component of the avionics system such that an instruction to manipulate the graphical element from the avionics user interface device takes priority over an instruction to manipulate the graphical element from the personal electronic device;
transmitting avionics data including graphics instructions from the avionics system to the personal electronic device;
determining an expected response to the avionics data from the personal electronic device via the processor in the avionics system, the expected response including at least one of a graphics response or a state change response;
receiving an actual response to the avionics data from the personal electronic device, the actual response determined based on the graphics instructions, and the actual response including at least one of an actual graphics response or an actual state change response;
comparing the actual response to the expected response;

determining a data integrity level of the personal electronic device based on the comparison; and displaying a message on the aircraft cockpit display in response to the data integrity level indicating that a loss of data integrity of the personal electronic device has occurred.

14. The method of claim 13, wherein establishing the limitation includes preventing the personal electronic device from interacting with a first display area of an aircraft cockpit display while permitting the personal electronic device to interact with a second display area of the aircraft cockpit display.

15. The method of claim 13, wherein establishing the limitation includes preventing the personal electronic device from interacting with a first graphical element displayed on an aircraft cockpit display while permitting the personal electronic device to interact with a second graphical element displayed on the aircraft cockpit display.

16. The method of claim 13, wherein the limitation is established based on one of an aircraft speed, a weight on wheels state, and an aircraft phase of flight, and wherein the aircraft phase of flight is one of a takeoff phase and a landing phase.

17. The method of claim 13, wherein granting priority over the personal electronics device to the avionics user interface device is based on the personal electronics device and the avionics user interface device attempting to perform a same task, and wherein the task is a data entry task.

18. The method of claim 13, wherein determining the data integrity level of the personal electronic device includes implementing one of a time delay threshold and a cyclic redundancy check.

19. The method of claim 13, wherein the expected response includes one of color data, line data, shape data, location data, final text character data, intermediate state data, and state transition data.

20. The method of claim 13, wherein the actual response is based on one of pixel data, graphics command data, intermediate state data, and state transition data.

* * * * *